US012582088B2

(12) United States Patent
Ayars

(10) Patent No.: US 12,582,088 B2
(45) Date of Patent: Mar. 24, 2026

(54) PET CAGE FLOOR PROTECTOR

(71) Applicant: Regina Ayars, Vineland, NJ (US)

(72) Inventor: Regina Ayars, Vineland, NJ (US)

( * ) Notice: Subject to any disclaimer, the term of this patent is extended or adjusted under 35 U.S.C. 154(b) by 0 days.

(21) Appl. No.: 18/963,731

(22) Filed: Nov. 28, 2024

(65) Prior Publication Data

US 2025/0169467 A1 May 29, 2025

Related U.S. Application Data

(60) Provisional application No. 63/603,362, filed on Nov. 28, 2023.

(51) Int. Cl.
*A01K 1/035* (2006.01)

(52) U.S. Cl.
CPC .................................... *A01K 1/035* (2013.01)

(58) Field of Classification Search
CPC .... A01K 1/035; A01K 1/0245; A01K 1/0353; A47G 27/0206; E02D 31/00; F16M 2200/08; B65D 81/056
USPC ......................................................... 119/416
See application file for complete search history.

(56) References Cited

U.S. PATENT DOCUMENTS

| | | | | | |
|---|---|---|---|---|---|
| 3,416,495 | A | * | 12/1968 | Wilson | A01K 1/0107 |
| | | | | | 493/93 |
| 3,701,465 | A | * | 10/1972 | Richter | B65D 81/056 |
| | | | | | 206/521 |
| 3,818,865 | A | * | 6/1974 | Sinclair | A01K 1/0114 |
| | | | | | 119/161 |

| | | | | | |
|---|---|---|---|---|---|
| 4,517,920 | A | * | 5/1985 | Yamamoto | A01K 1/0107 |
| | | | | | 119/166 |
| 8,113,146 | B2 | * | 2/2012 | Askinasi | A01K 1/0157 |
| | | | | | 119/169 |
| 2006/0102084 | A1 | * | 5/2006 | Garfield | A01K 1/0107 |
| | | | | | 119/165 |
| 2007/0084413 | A1 | * | 4/2007 | Oertel | A01K 1/0107 |
| | | | | | 119/165 |
| 2007/0089683 | A1 | * | 4/2007 | Roberts | A01K 31/06 |
| | | | | | 119/477 |
| 2008/0060585 | A1 | * | 3/2008 | Garfield | A01K 1/0107 |
| | | | | | 119/165 |
| 2008/0251026 | A1 | * | 10/2008 | Bell | A01K 1/0125 |
| | | | | | 119/168 |

(Continued)

FOREIGN PATENT DOCUMENTS

| | | | | | |
|---|---|---|---|---|---|
| GB | | 323317 | A * | 1/1930 | A47G 27/0206 |

*Primary Examiner* — Zoe Tam Tran
(74) *Attorney, Agent, or Firm* — Ashok Tankha

(57) ABSTRACT

A floor protector for a pet cage is disclosed. The floor protector includes a padding configured to underlay the base of the pet cage and multiple corner inserts. The padding comprises a base and a wall attached to a perimeter of the base. The wall extends perpendicularly upwards from the base and comprises an elastic liner attached lengthwise to the wall. The padding comprises an opening defined by the wall opposite to the base. The padding comprises corners, where each corner is defined by an intersection of two wall sections that are located adjacent to each other and the base. Each of the corners comprise a pocket. Each corner insert is configured to be positioned within a corresponding one of the pockets. The corner inserts are configured to support and uphold the wall, and are further configured to maintain the padding's shape and provide structural reinforcement to the corners.

4 Claims, 9 Drawing Sheets

(56)　　　　　　　　References Cited

U.S. PATENT DOCUMENTS

| 2012/0318206 | A1* | 12/2012 | van Leeuwen | A01K 5/0114 |
| | | | | 248/163.1 |
| 2015/0353232 | A1* | 12/2015 | Kandel | A47G 23/06 |
| | | | | 47/65.5 |
| 2016/0113232 | A1* | 4/2016 | Thompson | A01K 1/01 |
| | | | | 119/172 |
| 2017/0328390 | A1* | 11/2017 | Evans | F16B 2/22 |
| 2018/0160834 | A1* | 6/2018 | King | A01K 1/0125 |
| 2019/0038036 | A1* | 2/2019 | Squires | F16B 12/44 |
| 2020/0281156 | A1* | 9/2020 | Liu | A01K 1/03 |
| 2021/0227804 | A1* | 7/2021 | Huffman | A01K 1/035 |
| 2022/0167583 | A1* | 6/2022 | Nugent | A01K 1/0107 |
| 2023/0284588 | A1* | 9/2023 | Scott | A01K 1/035 |

* cited by examiner

103

101

103

101

PET CAGE FLOOR PROTECTOR

CROSS-REFERENCE TO RELATED APPLICATION

This application claims the benefit of provisional patent application No. 63/603,362 titled "No Scratch Pet Cage Floor Protector", filed in the United States Patent and Trademark Office on Nov. 28, 2023. The specification of the above referenced patent application is incorporated herein by reference in its entirety.

BACKGROUND

Pet kennels are widely used for housing pets, providing a secure space for rest or confinement. Traditionally, these kennels are placed directly on the floor in homes, veterinary clinics, and other environments. While floor-based placement is convenient and cost-effective, it has several inherent drawbacks that may affect the comfort of the pet, the cleanliness of the environment, and the overall user experience for pet owners. One significant issue with floor-based kennels is hygiene. These kennels, which have direct contact with the floor, are prone to collecting dust, debris, and pet hair underneath, making cleaning cumbersome. Accidents or spills inside the kennel can seep onto the floor, potentially causing stains, odors, and bacterial growth. This is particularly problematic in homes with hard-to-clean flooring, such as carpets or porous materials. Furthermore, the constant contact between the kennel and the floor may lead to wear and tear on both the kennel base and the flooring itself, particularly in areas with frequent movement or repositioning.

To address the drawbacks of floor-based kennels, pet owners often place a cloth or mat underneath the kennel. However, using a cloth or mat under the kennel is undesirable as it tends to shift with movement, fails to stay securely in place, and cannot be easily transported along with the kennel, leading to inconvenience and inefficiency. Therefore, there is a long felt need for a detachable floor protector that securely attaches to the base of a pet kennel or cage, preventing damage to both the kennel or cage base and the underlying flooring.

BRIEF DESCRIPTION OF THE DRAWINGS

The foregoing summary, as well as the following detailed description of the invention, is better understood when read in conjunction with the appended drawings. For illustrating the embodiments herein, exemplary constructions of the embodiments are shown in the drawings. However, the embodiments herein are not limited to the specific methods and components disclosed herein. The description of a method step or a component referenced by a numeral in a drawing is applicable to the description of that method step or that component shown by that same numeral in any subsequent drawing herein.

DETAILED DESCRIPTION OF THE INVENTION

Figure 1:
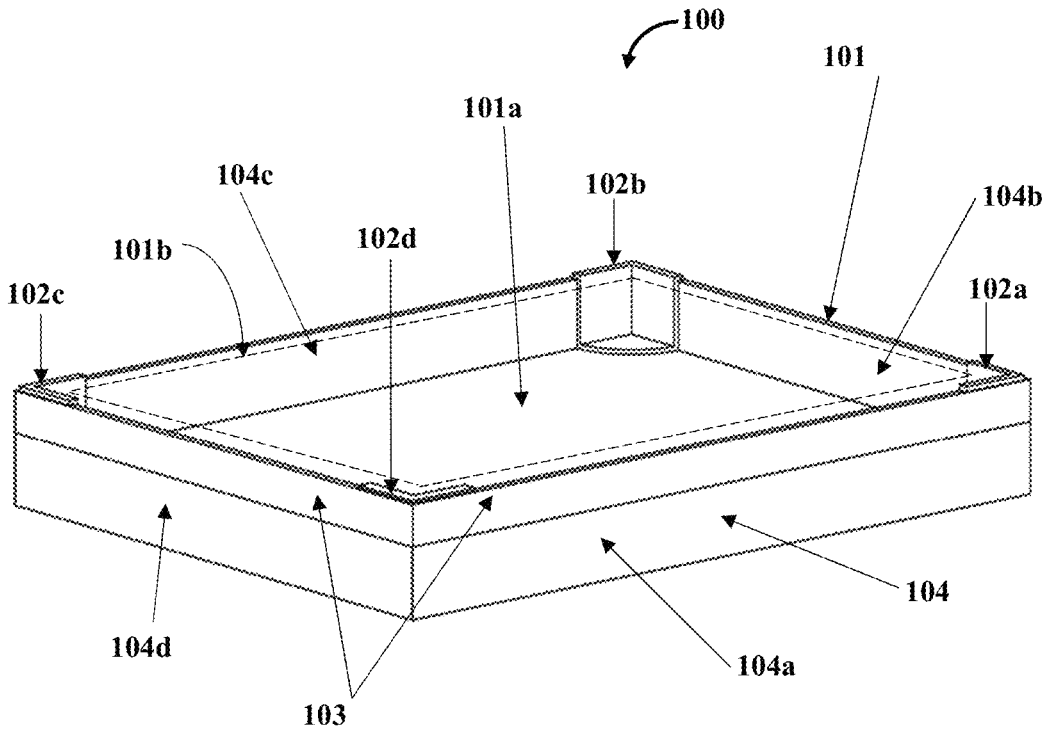
FIG. 1 exemplarily illustrates a floor protector for a pet cage.
Figure 2:
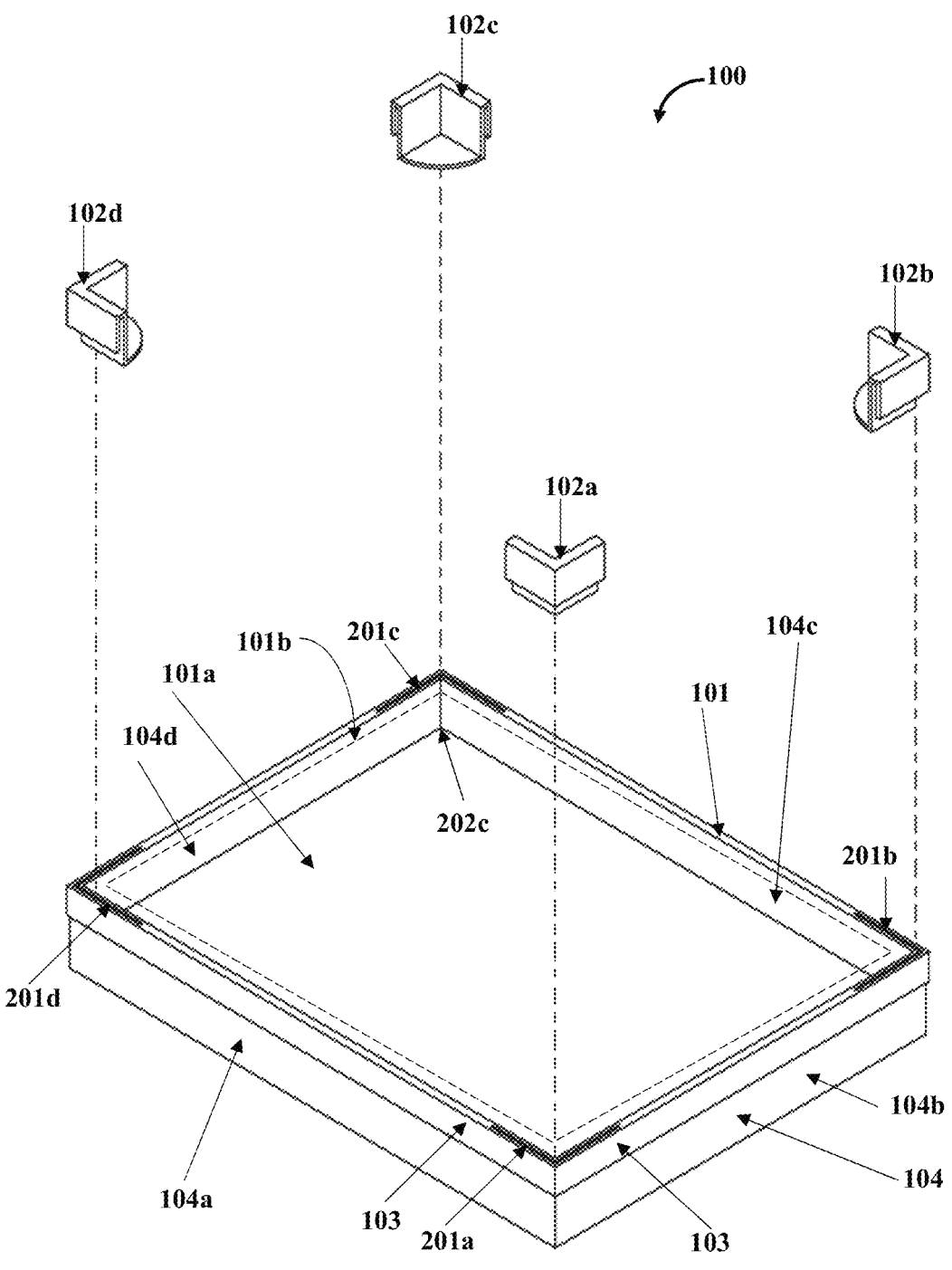
FIG. 2 exemplarily illustrates an exploded view of the floor protector for a pet cage.
Figure 5A:
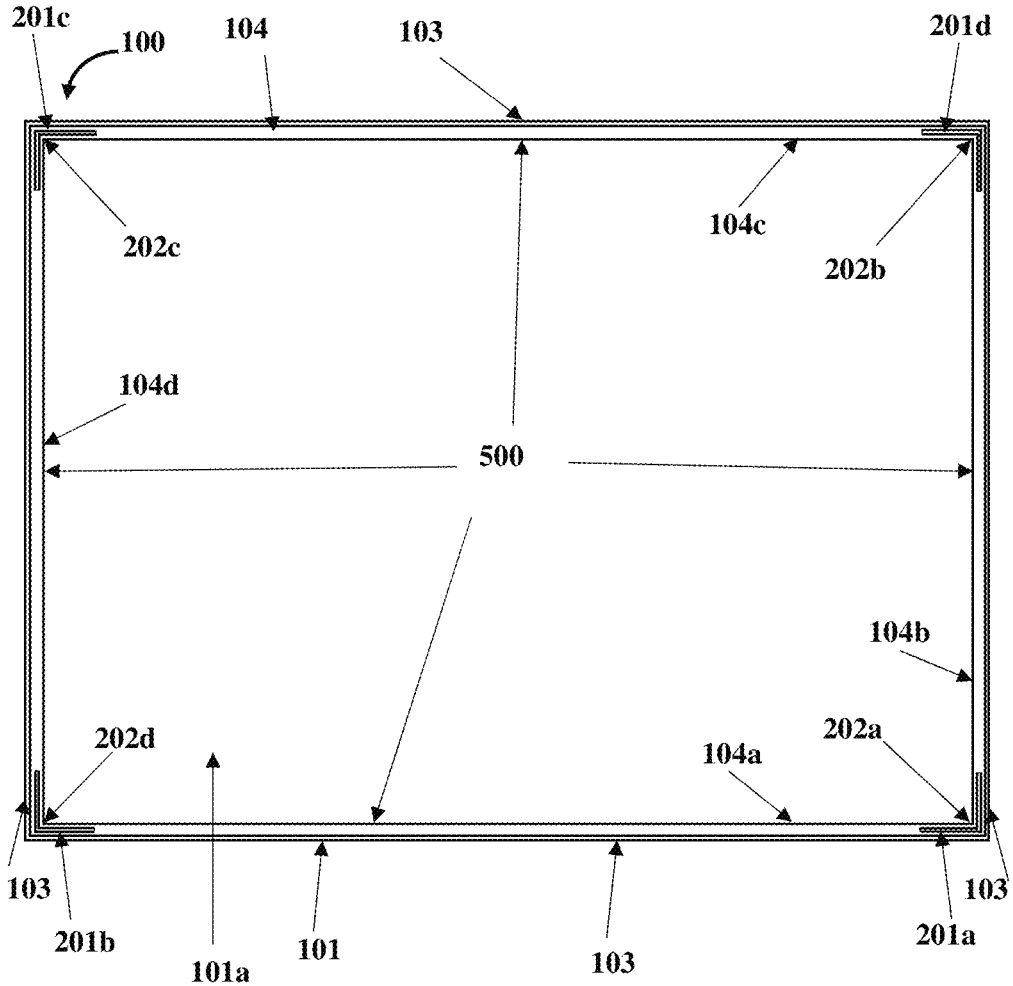
FIG. 5A exemplarily illustrates a top view of the floor protector for a pet cage without the corner inserts.
Figure 5B:
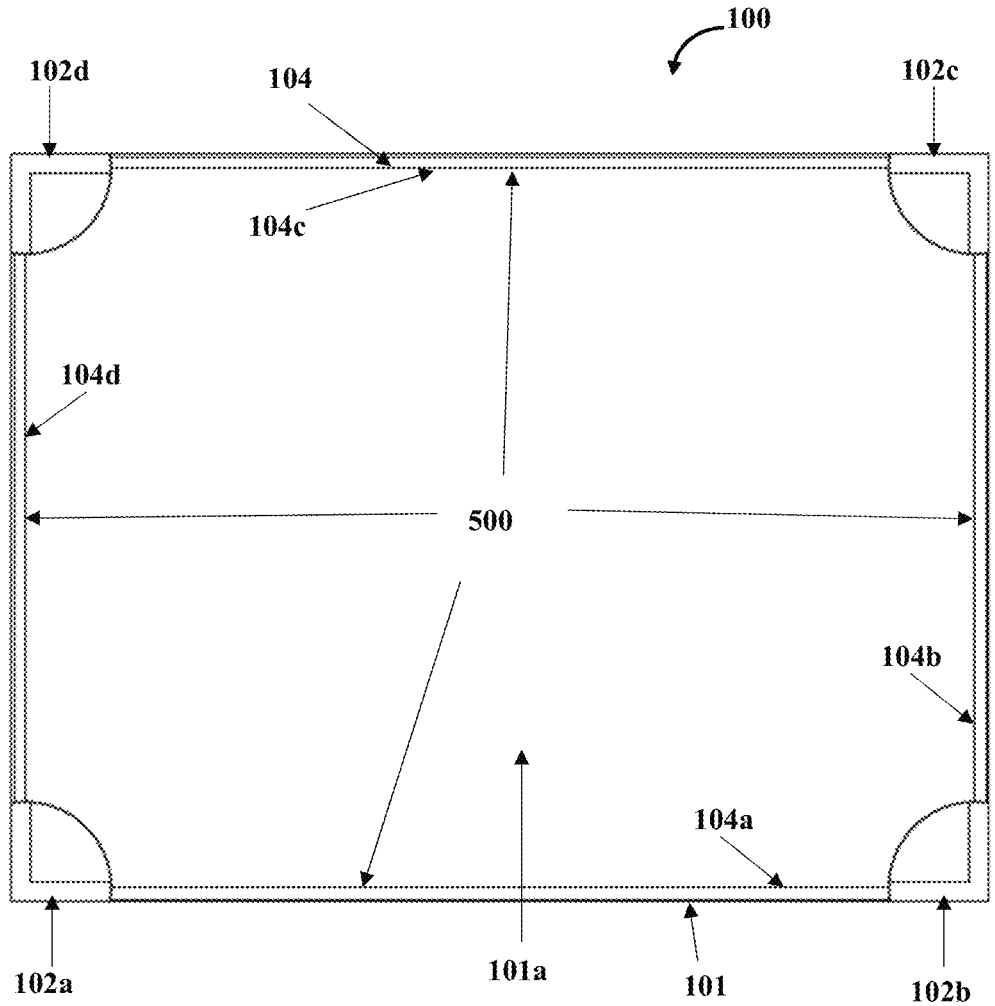
FIG. 5B exemplarily illustrates a top view of the floor protector for a pet cage with the corner inserts.
Figure 7A:
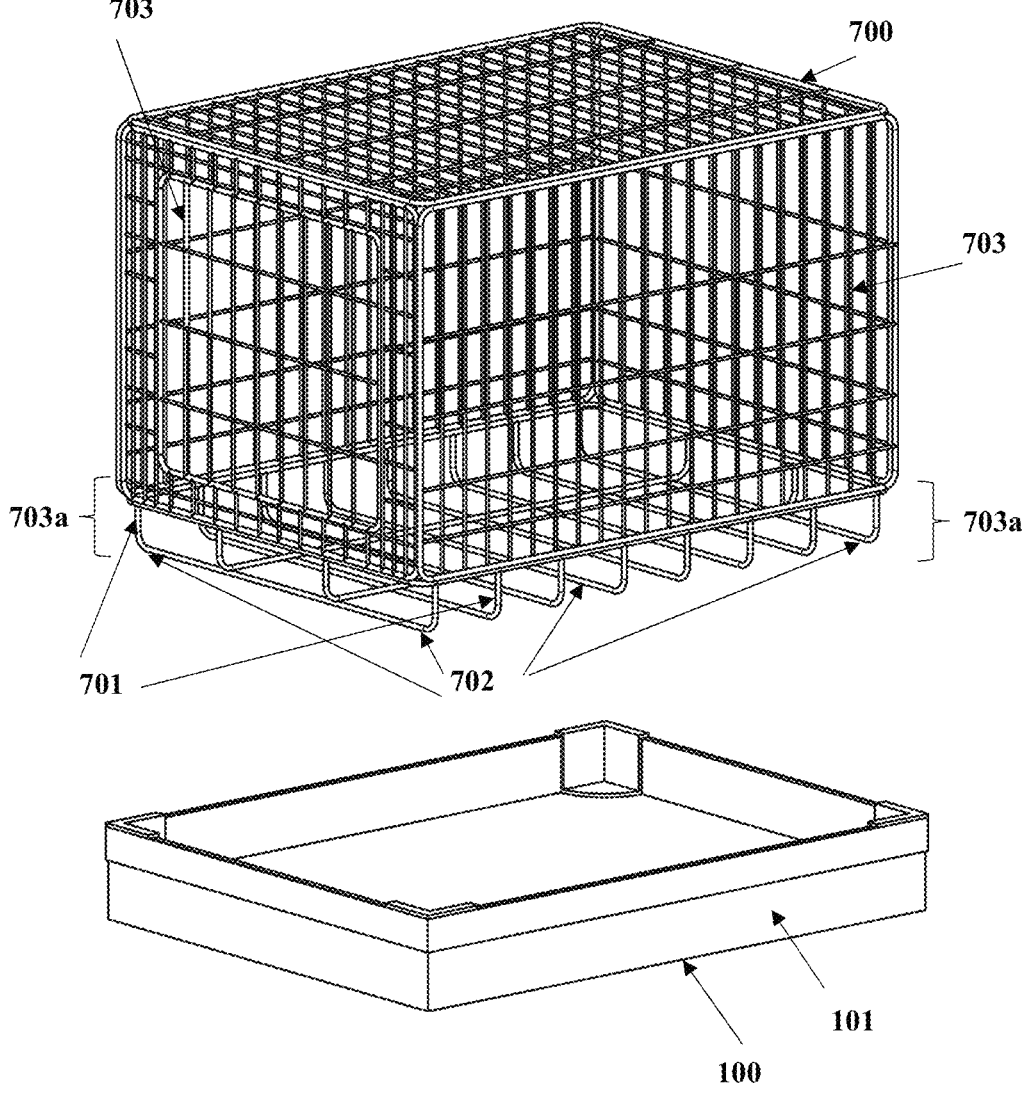
FIG. 7A exemplarily illustrates an exploded view showing the pet cage suspended over the floor protector.

FIG. 1 exemplarily illustrates a floor protector 100. The floor protector 100 is constructed to accommodate a pet cage 700, as shown in FIG. 7A. The floor protector 100 comprises a padding 101 configured to underlay a base 702 of the pet cage and multiple corner inserts 102a, 102b, 102c, and 102d. The padding 101 comprises a base 101a and a wall 104, as shown in FIG. 1. The wall 104 comprises multiple wall sections 104a, 104b, 104c, and 104d, as shown in FIG. 1. The wall 104 is attached to a perimeter 500 of the base 101a, as shown in FIGS. 5A and 5B. The wall 104 extends perpendicularly upwards from the base 101a. The wall 104 comprises an elastic liner 103 attached lengthwise to the wall 104, as shown in FIGS. 1, 2 and 5. As shown in FIGS. 5A and 5B, the elastic liner 103 extends along the entire length of the wall 104. In other words, the elastic liner 103 encircles an outer perimeter of the wall 104.

Figure 3:
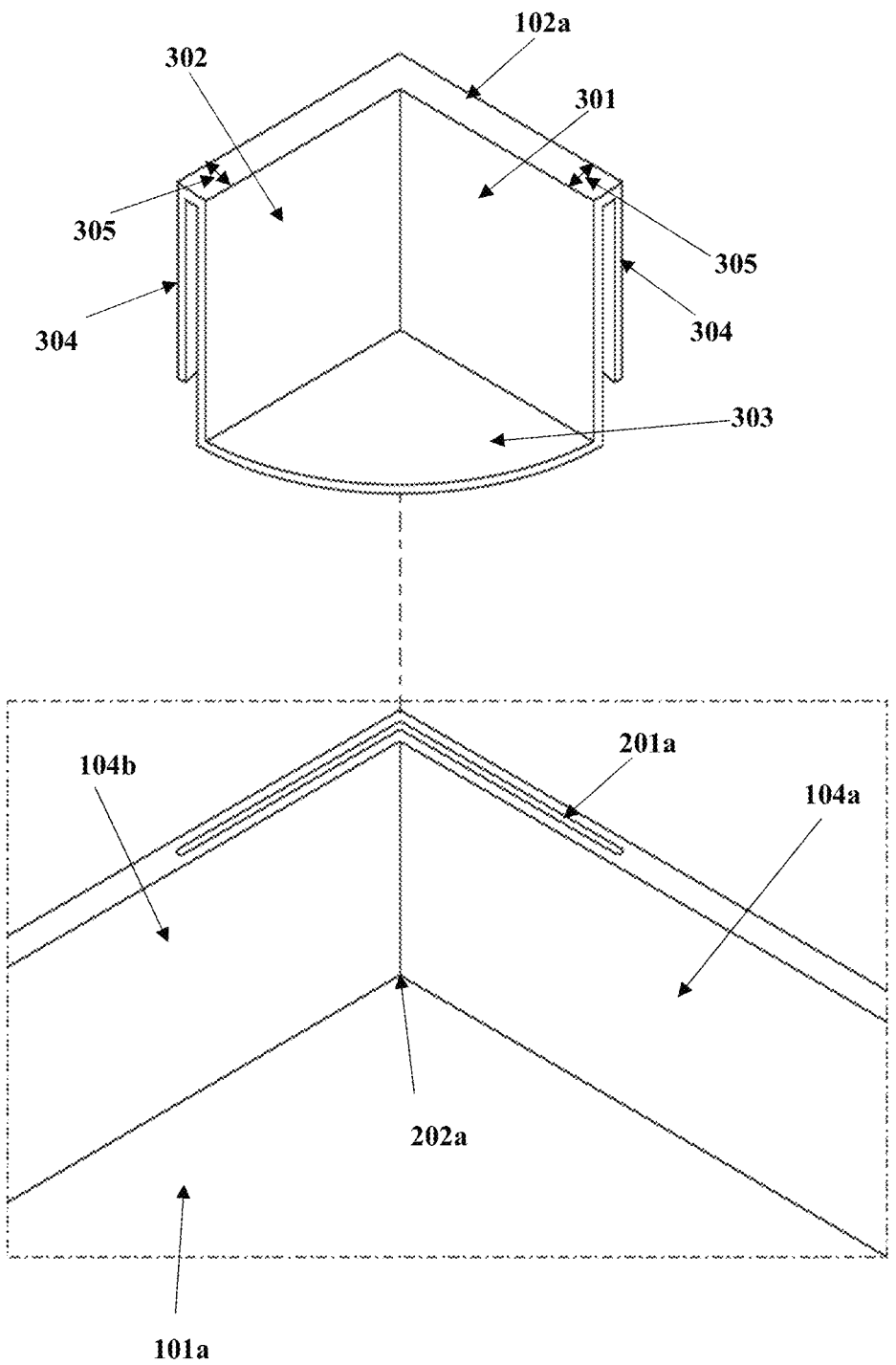
FIG. 3 exemplarily illustrates a corner insert positioned above the corresponding corner opening.
Figure 4:
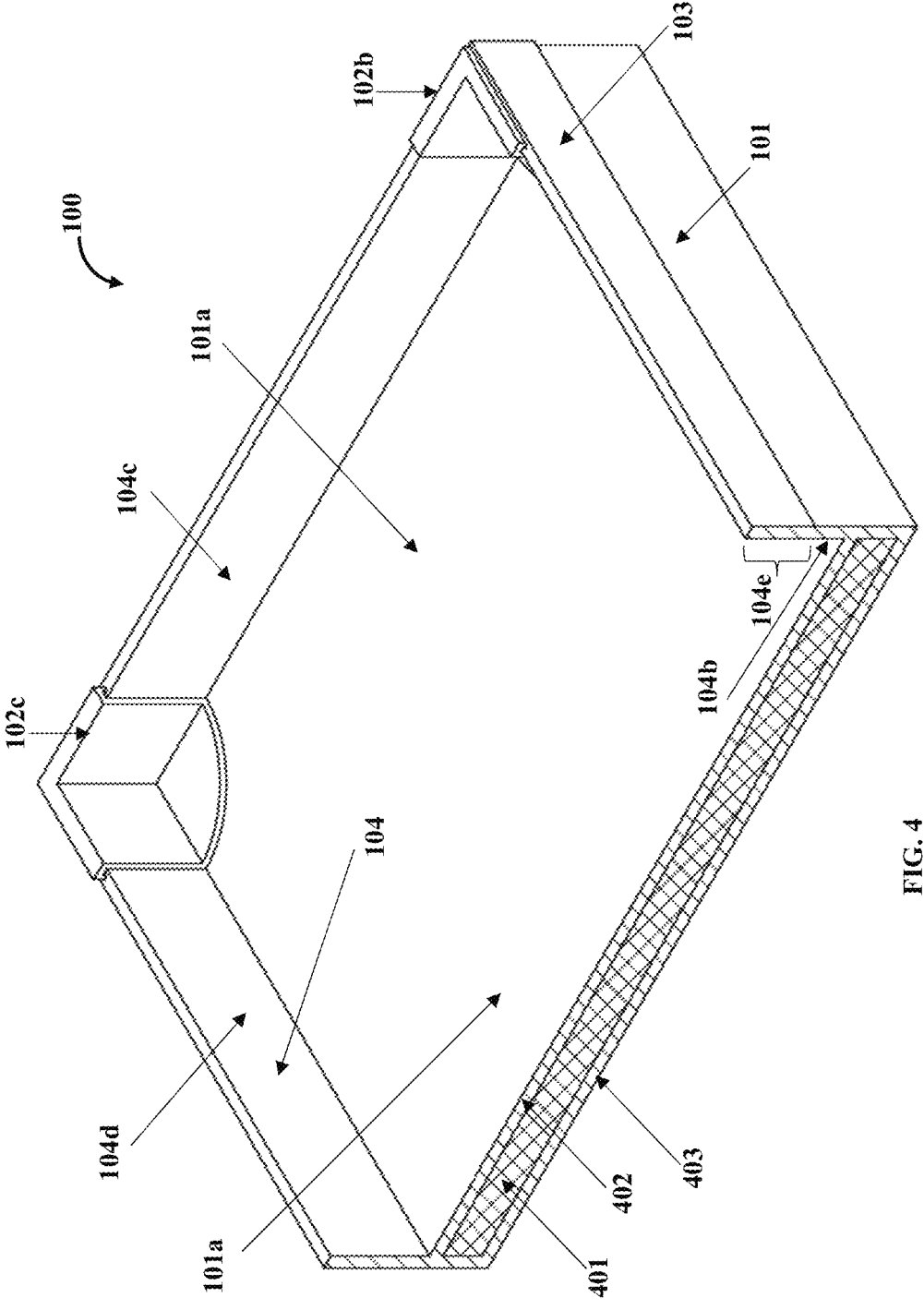
FIG. 4 exemplarily illustrates a cross-sectional view of the floor protector for a pet cage.

The padding 101 comprises an opening 101b defined by the wall 104, as shown in FIGS. 1 and 2. The opening 101b is located opposite to the base 101a. The elastic liner 103 is disposed around the opening 101b on an upper section 104e of the outer perimeter of the wall 104, as shown in FIG. 4. The padding 101 comprises multiple corners 202a, 202b, 202c, and 202d, as shown in FIGS. 2, 3, and 5A. As shown in FIG. 5A, each corner 202a, 202b, 202c, and 202d is defined by an intersection of two wall sections 104a, 104b, 104c, and 104d that are located adjacent to each other and the base 101a.

FIG. 2 exemplarily illustrates an exploded view of the floor protector 100 for a pet cage 700. Each of the corners 202a, 202b, 202c, and 202d comprise a pocket or corner opening 201a, 201b, 201c, and 201d. The corner inserts 102a, 102b, 102c, and 102d are made of plastic, rubber, etc. Furthermore, each of the corner insert 102a, 102b, 102c, and 102d is configured to be positioned within a corresponding one of the pockets 201a, 201b, 201c, and 201d. Furthermore, the corner inserts 102a, 102b, 102c, and 102d are configured to support and uphold the wall 104. The corner inserts 102a, 102b, 102c, and 102d are configured to maintain the padding's 101 shape and provide structural reinforcement to the corners 202a, 202b, 202c, and 202d.

The floor protector 100 does not scratch the floor. The wall 104 extends perpendicularly upwards from the base 101a of the padding 101, as shown in FIG. 4, along the sides 701 of the pet cage 700, as shown in FIG. 7A. A base 702 and a lower portion 702 of the pet cage 700 is accommodated within the padding 101 of the floor protector 100. Therefore, the floor protector 100 protects the flooring (not shown) and base boards (not shown) from scratches and other damages caused by either the pet cage 700 or a pet within the pet cage 700.

FIG. 3 exemplarily illustrates a corner insert 102a positioned above the corresponding corner opening 201a. Each corner insert 102a, 102b, 102c, and 102d is positioned within the corresponding pocket 201a, 201b, 201c, and 201d of the padding 101. As shown in FIG. 3, the opening of each of the pockets/corner openings 201a, 201b, 201c, and 201d is position at a top of a portion of the wall 104 where the pockets/corner opening 201a, 201b, 201c, and 201d is located. The corner inserts 102a, 102b, 102c, and 102d are structured to maintain the padding's 101 rectangular shape within the cage, and provide structural reinforcement to the corners of the floor protector 100. The corner inserts 102a, 102b, 102c, and 102d can easily slide in and out of the corresponding corner opening 201a, 201b, 201c, and 201d of the padding 101.

As shown in FIG. 3, each corner insert 102a, 102b, 102c, and 102d comprises a L-shaped body formed by intersection of two segments 301 and 302 of about equal length. In an embodiment, the segments 301 and 302 are flat rectangular pieces. In another embodiment, the segments 301 and 302 are flat square shaped pieces, as shown in FIG. 3. The segments 301 and 302 extend substantially perpendicularly from the intersection. The segments 301 and 302 further comprise a quadrant segment 303 attached at the bottom of the two perpendicular segments 301 and 302, and a sleeve 304 attached at the top of the two perpendicular segments 301 and 302. The sleeve is 304 attached to a flange 305 located at the top of the two perpendicular segments 301 and 302, as shown in FIG. 3. As shown in FIG. 3, the flange 305 projects perpendicularly from the top of the two perpendicular segments 301 and 302. The sleeve 304 extends downwards from the flange 305, parallel to the perpendicular segments 301 and 302. The sleeve 304 of each corner insert 102a, 102b, 102c, and 102d is inserted into the corresponding one of the pocket/corner opening 201a, 201b, 201c, and 201d located at each of the corners 202a, 202b, 202c, and 202d of the padding 101. The corner inserts 102a, 102b, 102c, and 102d keep the pet cage 700 from protruding through the padding 101. The quadrant segment 303 prevents the legs 702 of the pet cage 700 from protruding through the padding 101. In an embodiment, the corner inserts 102a, 102b, 102c, and 102d are configured according to the shape of the pet cage 700.

FIG. 4 exemplarily illustrates a cross-sectional view of the floor protector 100 for a pet cage 700. The base 101a of the padding 101 of the floor protector 100 comprises a thick filler material 401, for example, foam, interposed between and secured to two layers of quilting 402 and 403. The quilting 402 and 403 is configured for comfort.

FIG. 5A exemplarily illustrates a top view of the floor protector for a pet cage without the corner inserts 102a, 102b, 102c, and 102d. FIG. 5B exemplarily illustrates a top view of the floor protector 100 for a pet cage with the corner inserts 102a, 102b, 102c, and 102d. In an embodiment, the floor protector 100 is configured according to the shape of the pet cage 700. As shown in FIGS. 1, 2, 5A-7B, the padding 101 has one of a rectangular shape, a square shape, and a polygonal shape.

Figure 6A:
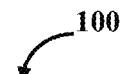
FIG. 6A exemplarily illustrates a left-side view of the floor protector for a pet cage.
Figure 6A:
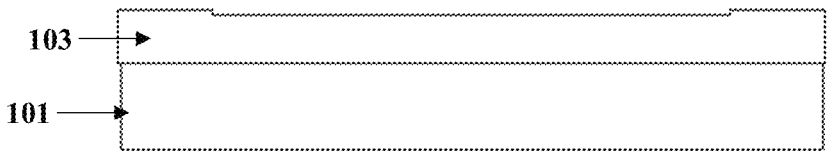
Figure 6B:
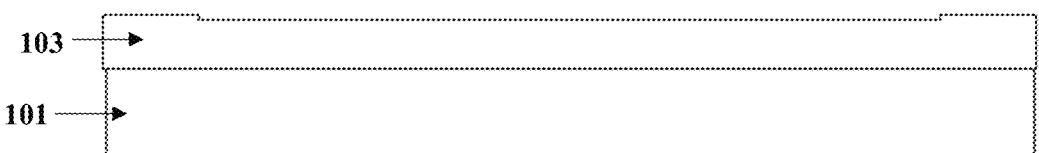
FIG. 6B exemplarily illustrates a right-side view of the floor protector for a pet cage.

FIG. 6A exemplarily illustrates a left-side view of the floor protector 100 for a pet cage 700. FIG. 6B exemplarily illustrates a right-side view of the floor protector 100 for a pet cage 700.

Figure 7B:
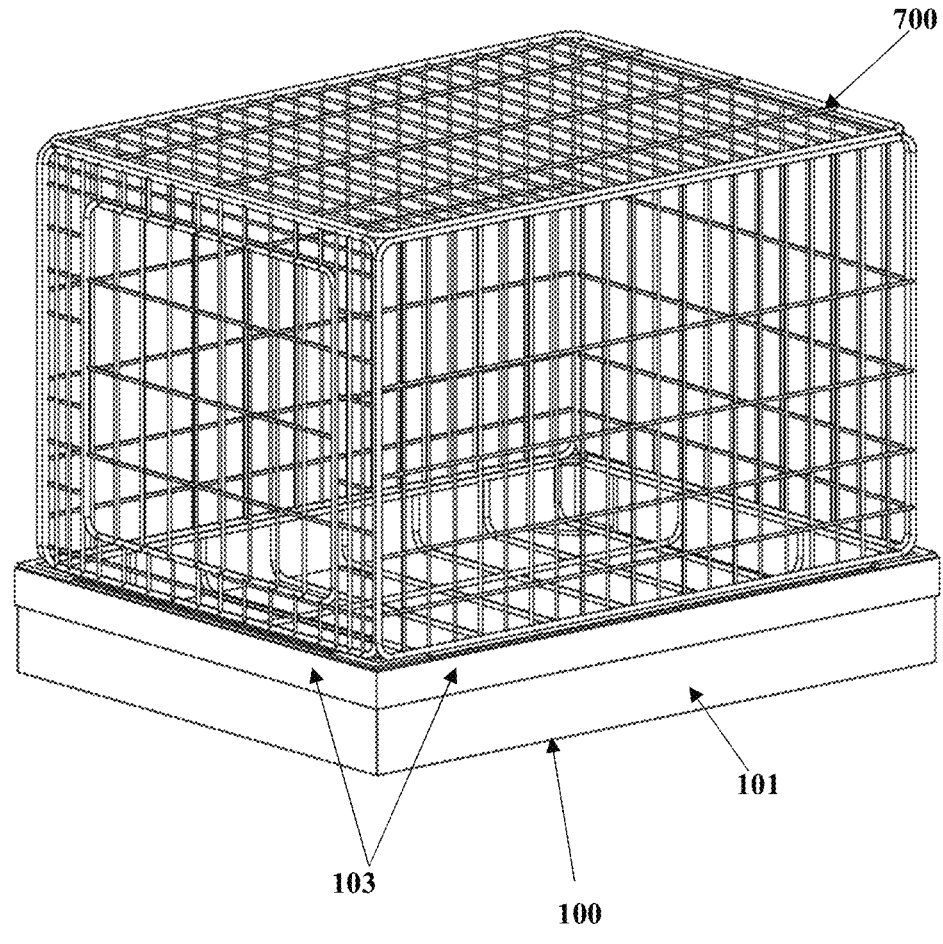
FIG. 7B exemplarily illustrates a pet cage positioned on the floor protector.

FIG. 7A exemplarily illustrates an exploded view showing the pet cage 700 suspended over the floor protector 100. FIG. 7B exemplarily illustrates a pet cage 700 positioned on floor protector 100. After the pet cage 700 is positioned on the floor protector 100, the wall 104 extends upward to slightly cover the lower sections 703a of the pet cage walls 703, as shown in FIG. 7A. The elastic liner 103 of the padding 101 is structured to securely grasp the lower sections 703a of the pet cage walls 703. The base 101a of the padding 101 is configured to underlay a base 702 of the pet cage 700.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments herein extend to all functionally equivalent structures, methods, systems, and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope of the embodiments disclosed herein.

I claim:

1. A floor protector for a pet cage, comprising:
   a padding, wherein the padding comprises:
      a base configured to underlay a bottom of the pet cage; and
      a wall comprising a plurality of wall sections, wherein the wall is attached to a perimeter of the base, wherein the wall extends perpendicularly upwards from the base, wherein the wall comprises an elastic liner attached lengthwise to the wall, wherein the padding comprises an opening defined by the wall and located opposite to the base, wherein the padding comprises a plurality of corners, wherein each corner is defined by an intersection of two of said wall sections located adjacent to each other and the base, and wherein each of the corners comprise a pocket;
   a plurality of corner inserts, wherein each corner insert is disposed within a corresponding pocket, wherein the corner inserts are configured to support and uphold the wall, and wherein the corner inserts maintain the padding's shape and provide structural reinforcement to the corners, wherein each corner insert comprises a L-shaped body formed by two segments of equal length and extend perpendicular from the intersection, a quadrant segment attached at a bottom of the two perpendicular segments, a flange projecting perpendicularly from a top of the two perpendicular segments, and a sleeve extending downwards from the flange, parallel to the two perpendicular segments, and wherein the sleeve of each corner insert is configured to be inserted into the corresponding pocket located at each of the corners.

2. The floor protector of claim 1, wherein the wall is configured to partially cover a lower section of the pet cage walls, and wherein the elastic liner of the padding is configured to securely grasp the lower section of the pet cage walls.

3. The floor protector of claim 1, wherein the base of the padding comprises a thick filler material interposed between and secured to two layers of quilting, wherein the quilting is configured for comfort.

4. The floor protector of claim 1, wherein the padding has one of a rectangular shape, a square shape, and a polygonal shape.

\* \* \* \* \*